No. 749,974. PATENTED JAN. 19, 1904.
P. SYNNESTVEDT.
FLUID PRESSURE REGULATING DEVICE.
APPLICATION FILED DEC. 21, 1900.
NO MODEL.
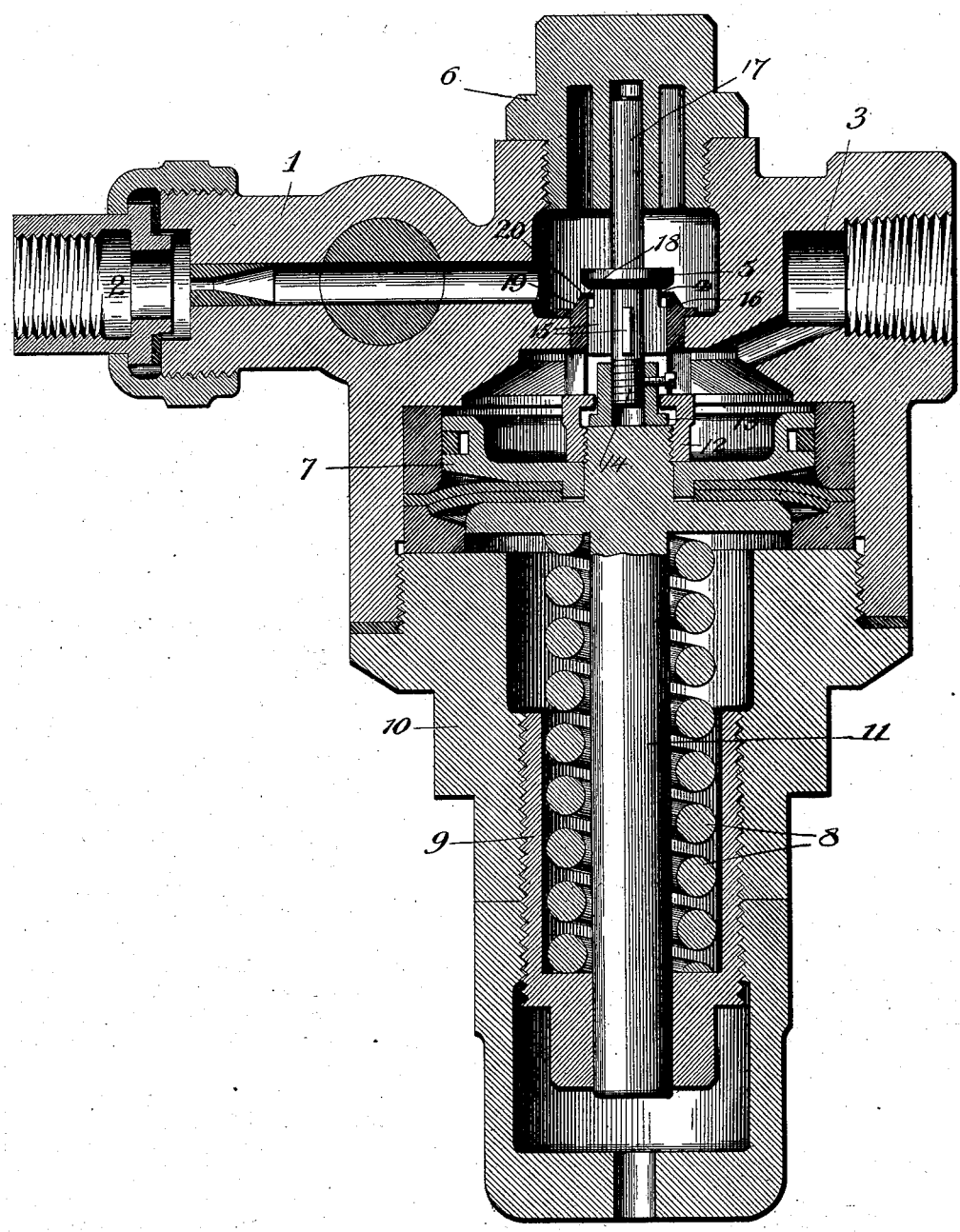
Witnesses:
Inventor:
Paul Synnestvedt No. 749,974. Patented January 19, 1904.

UNITED STATES PATENT OFFICE.

PAUL SYNNESTVEDT, OF GLENVIEW, ILLINOIS, ASSIGNOR TO WESTINGHOUSE AIR BRAKE COMPANY, OF WILMERDING, PENNSYLVANIA, A CORPORATION OF PENNSYLVANIA.

FLUID-PRESSURE-REGULATING DEVICE.

SPECIFICATION forming part of Letters Patent No. 749,974, dated January 19, 1904.

Application filed December 21, 1900. Serial No. 40,705. (No model.)

*To all whom it may concern:*

Be it known that I, PAUL SYNNESTVEDT, a citizen of the United States, residing at Glenview, Cook county, Illinois, have invented certain new and useful Improvements in Fluid-Pressure-Regulating Devices, of which the following, taken in connection with the accompanying drawings, is a specification.

My invention relates to means for maintaining a constant pressure of fluid, and particularly to the regulating valves such as used in a brake apparatus. The objects of the invention are, to provide a valve which is moved to its seat by means located on the low pressure side of the valve, and positively moved to close and not depending on spring power or the pressure of the fluid; to provide a superior valve seat and superior means for holding the valve accurately on the seat; to provide superior delicate adjusting means for the valve, and to generally improve the structure and operation of pressure regulated valves.

The above objects, as well as other advantages which will hereinafter appear, I attain by means of the construction illustrated in preferred form in the accompanying drawing, which represents a vertical central section through the valve casing and the various parts thereof, as hereinafter described.

The main body of the valve casing, marked 1, is provided with an inlet opening 2 and an outlet opening 3 connected by means of the port 4 which is controlled by the valve 5, introduced to its position through the opening at the top of the casing closed by the screw nut 6. The casing 1 has a chamber of much larger diameter than the valve opening, and a movable abutment 7 therein, provided with a stem 11, and is normally pressed upward by means of the coiled spring 8 which is seated in the nut 9 screwed into the lower end of the casing from the top. The stem 8 of the piston is guided through the lower end of the nut 9 as will be plain, and the piston 7 fixed thereon may be provided with a flexible diaphragm to make it air tight.

To the upper end of the stem of the piston is attached an interiorly threaded washer nut 12 provided with a flange which confines the shouldered sleeve 13, the two parts being so constructed that there is a little play of the latter between the washer nut flange and the end of the piston stem. The stem 17 of the puppet valve 5 is threaded into the collar 13 in order that the distance between the valve and the piston 7 may be regulated, and the said stem may be fixed in place by means of a set screw as shown.

It will be observed from this construction that upon the escape from the supply port 2 through the port 4, in its travel to outlet passage 3, the fluid pressure is exerted upon the piston 7 on the low pressure side of the valve, and by reason of the larger area of the piston 7 it exerts a positive pressure downward to seat the valve 4 when the pressure on the low side of the valve rises above that provided for by the strength of the spring 8. The play allowed in the connection between this movable abutment and the stem of the valve, provides for slight tremulations or sudden vibrations of the movable abutment without disturbing the valve.

In order to more accurately guide the motion of the puppet valve 4, I provide it with the wings 15 to move within the socket ring 16, and extend the stem 17 into a socket in the cap nut 6 at the top.

In order to minimize as much as possible the great difficulty generally encountered in this type of valves, of becoming encumbered by accumulation of dirt around and upon the seat of the valve and interfering with the closure of the same, I construct the valve seat 18 on top of the ring 16 at an elevation above the surrounding walls of the casing and provide it with both an inside and an outside conical surface, so that the surface of the annular ridge 20 outside of the valve seat, slopes off sharply away from the valve, while the inside or valve seat proper is of a conical form ending at the top in a sharp ridge. The removable ring 16 is inserted into its place through the opening made by the removal of the nut 6 at the top, the stem of the valve being of sufficient length to easily manipulate it from the same direction; and it will be observed that it can be screwed into its loose connection with the movable abutment so as to accurately and nicely adjust it to its seat. The piston is inserted in its place from below the casing 1 by removal of the part 10, as will be evident. These features of construction give ready access to all of the parts in order to clean them as well as to adjust them.

From this construction, it will be observed that I have provided a superior form of seating for the valve, which is convenient to be cleaned and which, of itself, is of a form to readily remove any dirt that may accumulate thereunder or prevent its accumulation. At the same time the valve itself is not seated merely by the pressure behind it on the high pressure side of the valve nor is it dependent on a spring as heretofore customary, but the seating of the valve is caused by the pressure on the low pressure side upon a largely augmented area of the movable abutment 7, and it will be observed that in case of any leakage past the valve this leakage at once takes effect upon the abutment 7 to further push the valve into its place and tighten the same, so that even if dirt should accumulate upon the surface of the valve seat 18 it would eventuate in allowing escape of pressure so great as to cause the valve to be pressed down to place in spite of the dirt. In the ordinary construction of such valves, where the movable abutment on the outlet side of the valve is intended merely to recede and allow the valve itself to drop upon its seat by reason of the pressure on the high pressure side or by means of a spring, the result is that in case of leakage however high the pressure may become on the low pressure side it has no further effect in seating the valve than originally introduced by removing the support which held the valve off the seat. But it will be seen in the present case that every increase of pressure on the low pressure side tends that much the more to seat the valve tightly into place and the leakage of the valve itself causes a tighter seating of the same.

Having thus described my invention and illustrated its use, what I claim as new, and desire to secure by Letters Patent, is the following:

1. The combination with a valve casing having an inlet and outlet and a valve seat, of a puppet valve, a movable abutment of larger area than the puppet valve, adjustable connections between the movable abutment and the puppet valve positively moving said valve both to and from its seat, but provided with means for play of motion between the two, the said abutment being placed upon the outlet side of the valve, whereby the low pressure side operates to positively seat the valve and said abutment may make small motions without moving the valve off its seat, substantially as described.

2. In a pressure regulating valve the combination with a puppet valve, a movable abutment on the low pressure side of the valve, differential connection between the valve and the abutment, and a valve seat in the form of a raised annular ring having an inside conical surface corresponding to the face of the valve, and an outside conical surface ending in a sharp annular ridge, substantially as described.

3. In a pressure regulating device the combination of a casing with an inlet and outlet and with an enlarged chamber, a movable abutment in said large chamber, a cap closing said chamber and a spring and stem for holding the abutment in normal position therein, a puppet valve between said inlet and outlet, a removable seat for said puppet valve comprising a sharp annular ridge with conical inside and outside surfaces, and a screw cap having means for guiding said valve.

4. In a pressure regulating valve the combination with a casing having a valve opening and a large chamber, a movable abutment in said chamber, a puppet valve, an adjustable connection allowing play between the stem of the puppet valve and said abutment, a spring for normally holding said abutment up and indirectly holding said puppet valve off its seat, and said abutment being on the low pressure side of the valve, whereby the escape of fluid acts upon said abutment to close said valve positively upon its seat, substantially as described.

5. In a pressure regulating valve the combination with a movable abutment, of a flanged retaining nut thereon, a sleeve having an annular flange loosely working in said flange nut, a valve stem screwed into said sleeve, a puppet valve and seat, the said movable abutment being placed on the low pressure side of the said valve, whereby the said abutment moves the valve to and from its seat but allows of some play of motion between the abutment and the valve, substantially as described.

PAUL SYNNESTVEDT.

Witnesses:
PAUL CARPENTER,
FRANK GREEN.